(12) United States Patent
Fischl

(10) Patent No.: US 6,782,099 B1
(45) Date of Patent: Aug. 24, 2004

(54) SPEAKER-PHONE BASE FOR A PORTABLE TELEPHONE

(75) Inventor: Steven R. Fischl, Lawrenceville, GA (US)

(73) Assignee: Motorola, Inc., Schaumburg, IL (US)

(*) Notice: Subject to any disclaimer, the term of this patent is extended or adjusted under 35 U.S.C. 154(b) by 468 days.

(21) Appl. No.: 09/592,209

(22) Filed: Jun. 10, 2000

(51) Int. Cl.[7] .............................................. H04M 1/00
(52) U.S. Cl. ................... 379/420.02; 379/446
(58) Field of Search ................. 379/420.02, 420.01, 379/446, 454, 455, 420.04; 455/90.3

(56) References Cited

U.S. PATENT DOCUMENTS

| | | | | |
|---|---|---|---|---|
| 5,539,821 A | * | 7/1996 | Blonder ...................... | 379/446 |
| 5,822,427 A | * | 10/1998 | Braitberg et al. ........... | 379/446 |
| 6,138,041 A | * | 10/2000 | Yahia ......................... | 379/446 |

* cited by examiner

*Primary Examiner*—Jack Chiang
(74) *Attorney, Agent, or Firm*—Philip H. Burrus, IV

(57) ABSTRACT

A speaker-phone base for supporting a portable telephone electrical interface, in which the interface having an interface electrical power connector and an interface audio connector, includes a base member. The base member defines a portable telephone electrical interface receptacle that is shaped so as to be capable of receiving therein a portable telephone electrical interface. A base electrical power connector is disposed within the receptacle so as to electrically engage the interface power connector when the interface is placed in the receptacle. The base electrical power connector is complementary to the interface electrical power connector and electrically coupled to an electrical power source. A base audio connector is also disposed within the receptacle so as to electrically engage the interface audio connector when the interface is placed in the receptacle. The base audio connector is complementary to the interface audio connector. A speaker and a microphone are each integral with the base member. A speaker-phone audio circuit is electrically coupled to the base audio connector, the speaker and the microphone. The speaker-phone audio circuit is capable of receiving a telephone audio signal from a portable telephone via the base audio connector and capable of causing the speaker to generate sound corresponding to the telephone audio signal. The speaker-phone audio circuit is also capable of receiving a voice signal from the microphone and transmitting a telephone transmit signal to a portable telephone via the base audio connector.

3 Claims, 2 Drawing Sheets

SPEAKER-PHONE BASE FOR A PORTABLE TELEPHONE

BACKGROUND OF THE INVENTION

1. Field of the Invention

The present invention relates to telephone systems and, more specifically, to a speaker-phones.

2. Description of the Prior Art

Portable telephones, such as cellular telephones, often have attachments that allow hands-free operation. Some such attachments include headset systems and also speaker-phone attachments. Speaker-phone attachments allow the user to turn the portable telephone into a speaker-phone by tapping the audio signal from the portable telephone, amplifying it and sending it to a speaker. Such attachments usually require connecting a jack on the telephone to the speaker-phone attachment via a loose wire terminated by a plug. Plugging the plug into the jack can be awkward and the loose wire sometimes gets tangled with other wires.

Therefore, there is a need for a speaker-phone attachment for a portable telephone that allows direct connection.

DETAILED DESCRIPTION OF THE INVENTION

Figure 1:
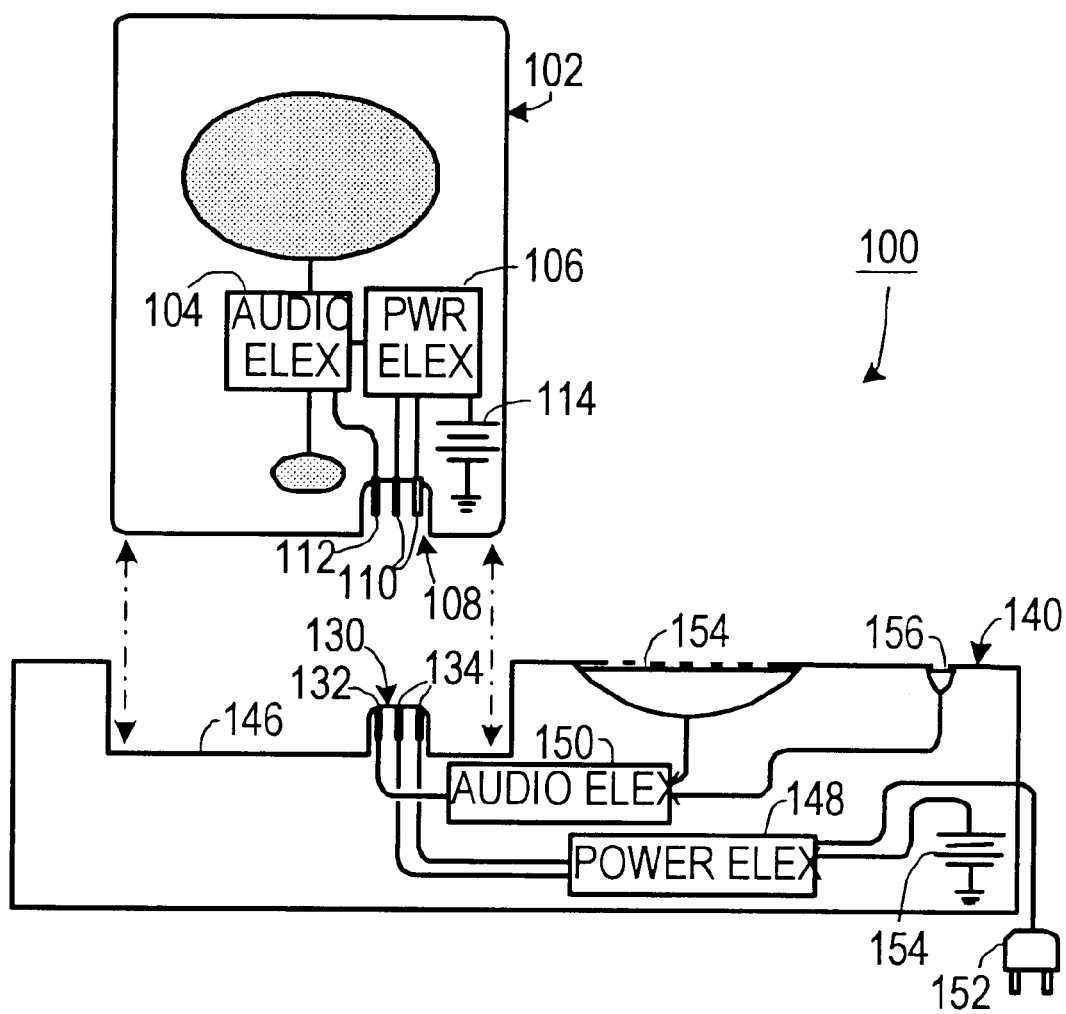
FIG. 1 is a schematic drawing of one illustrative embodiment of the invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a,", "an," and "the" includes plural reference, the meaning of "in" includes "in" and "on."

As shown in FIG. 1, one embodiment of the invention 100 includes a speaker-phone base 140 for a portable telephone 102, such as a cellular telephone. Typically, the portable telephone 102 will include a interface jack 108 that houses an interface electrical power connector 110 and an interface audio connector 112. Connected to interface electrical power connector 110 is a power electronic circuit 106 that delivers electrical power from a battery 114 to the rest of the telephone 102 and that controls charging functions for the battery 114. An audio electronic circuit 104 is connected to the interface audio connector 112 and controls the telephony and audio functions of the telephone 102.

The speaker-phone base member 140 defines a portable telephone electrical interface receptacle 146 that is shaped so as to be capable of receiving therein the interface jack 108 and the telephone 102. Disposed within the receptacle 146 is a base jack 130 that includes a base electrical power connector 134 and a base audio connector 132. The base electrical power connector 134 is complementary in shape and function to the interface electrical power connector 110, and the base audio connector 132 is complimentary in shape and function to the interface audio connector 112.

A speaker 154 and a microphone 156 are also disposed in the base member 146. A speaker-phone audio circuit 150 is electrically coupled to the base audio connector 132, the speaker 154 and the microphone 156. The speaker-phone audio circuit 150 drives the speaker-phone aspect of the invention. The speaker-phone audio circuit 150 receives telephone audio signals from the portable telephone 102 via the base audio connector 132 and causes the speaker 154 to generate sound corresponding to the telephone audio signal. The speaker-phone audio circuit 150 also receives voice signals (sound) from the microphone 156 and transmits corresponding telephone transmit signals to portable telephone 102 via the base audio connector 132.

A power circuit 148 connects a power source (such as a battery 154 or a utility electrical input 152) to the telephone 102 via the electrical power connector 134. The power circuit 148 can perform several functions, depending upon the specific application. For example, if the base member 140 includes both a battery 154 and a utility electrical input 152, then the power circuit 148 can control the switching from the utility electrical input 152 to the battery 154 when switching from a fixed mode of operation to a portable mode of operation. In certain applications, the power circuit could also control recharging functions in the battery 114 of the portable telephone 102, thereby allowing for a smaller telephone 102. If the utility electrical input 152 is not plugged into a utility power outlet, then the base member 140 may be used as a portable speaker-phone, running off of the battery 154.

Figure 2:
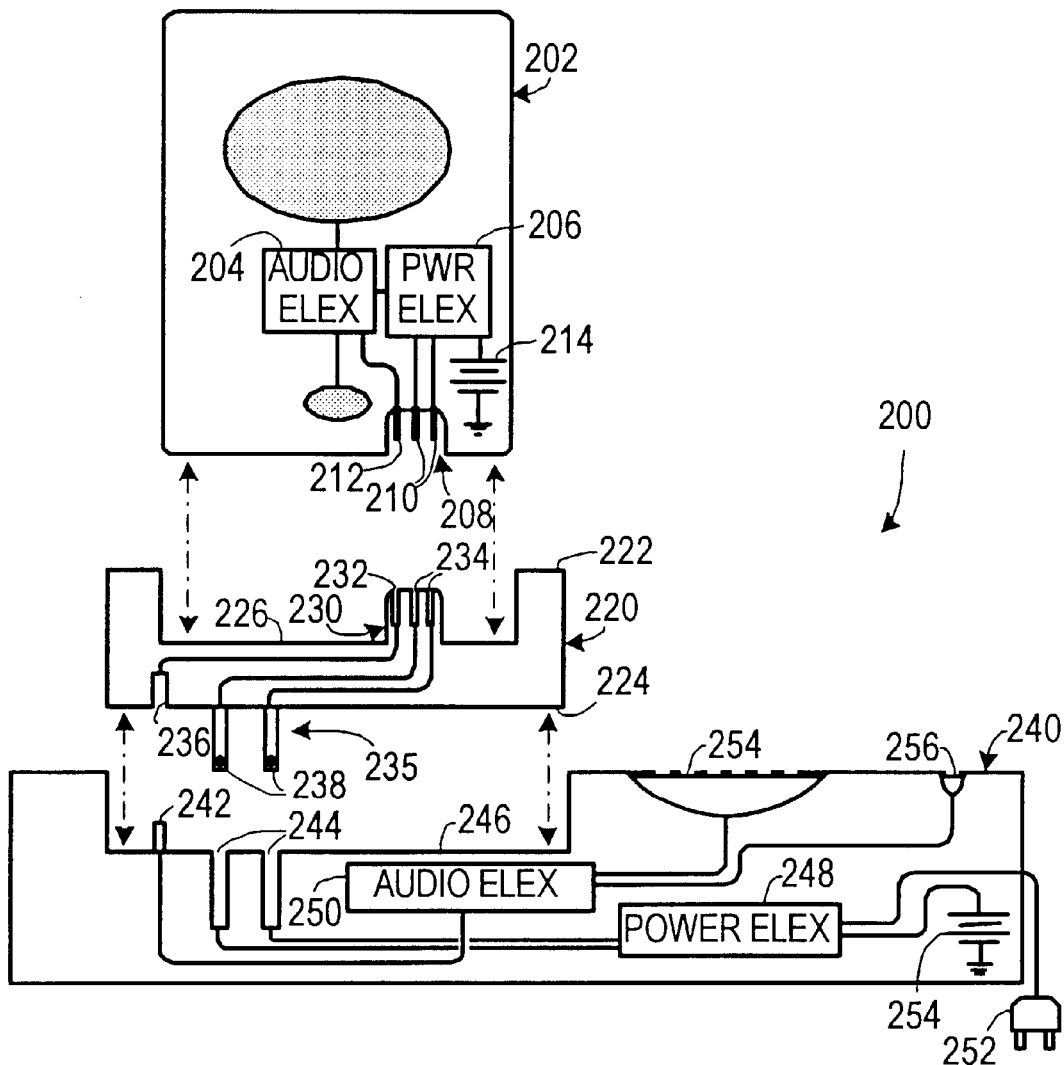
FIG. 2 is a schematic drawing of a second illustrative embodiment of the invention.

A second embodiment of the invention 200, as shown in FIG. 2, includes an insert 220 that includes an insert jack 230, having an audio connection 232 and a power connection 234, and an insert interface 235. The insert interface 235 includes a male power plug 238 and an audio plug 236. Similarly, the base member 240 includes a female power plug 244, which is coupled to the power circuit 248, and an audio plug 242, which is coupled to the audio circuit 250, both disposed in the receptacle 246. The insert 220 has a first side 222, that defines a receptacle cavity 226 in which the insert jack 230 is disposed, and an opposite second side 224. The second side 224 acts as a bottom interface surface that is complementary in shape to the base member receptacle 246. The telephone 202 fits into the insert receptacle cavity 226, coupling to the insert jack 230. The insert 220 can be plugged into either a utility power wall socket (not shown) for direct recharging, or the insert 220 can be plugged into the base member 240 for recharging and for use as a speaker-phone.

In accordance with the invention, different types inserts 220 could be made for different types of telephones. However each type of insert 220 could be compatible with a single type of common base member 240, thereby allowing different telephones 202 to share a common speaker-phone base 240.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. A speaker-phone base for supporting a portable telephone electrical interface, the interface having an interface electrical power connector and an interface audio connector, the speaker-phone base, comprising:

a. a base member defining a portable telephone interface receptacle, the receptacle shaped so as to be capable of receiving therein a portable telephone interface;

b. a base electrical power connector disposed within the receptacle so as to electrically engage the interface electrical power connector when the interface is placed in the receptacle, the base electrical power connector being complementary to the interface electrical power connector and electrically coupled to an electrical power source;

c. a base audio connector disposed within the receptacle so as to electrically engage the interface audio connector when the interface is placed in the receptacle, the base audio connector complementary to the interface audio connector;

d. a speaker integral with the base member;

e. a microphone integral with the base member; and f. a speaker-phone audio circuit electrically coupled to the base audio connector, the speaker and the microphone, the speaker-phone audio circuit being capable of receiving a telephone audio signal from a portable telephone via the base audio connector and being capable of causing the speaker to generate sound corresponding to the telephone audio signal, the speaker-phone audio circuit also being capable of receiving a voice signal from the microphone and being capable of transmitting a telephone transmit signal to a portable telephone via the base audio connector, further comprising a telephone-specific insert portion for interfacing a cellular telephone to the base member, the insert portion having a first side that defines a cavity, complimentary in shape to a portion of a cellular telephone, and an opposite second side that is complimentary in shape to a portion of the receptacle, wherein the telephone-specific insert may be plugged into either a utility power wall socket or the base member.

2. The speaker-phone base of claim 1, wherein telephone-specific insert portion comprises:

a. an insert audio connector, disposed adjacent the second side and complimentary in shape and disposition to the base audio connector;

b. a telephone audio connector, electrically coupled to the insert audio connector, disposed on the first side within the cavity, and shaped so as to be coupled to an audio connector of a cellular telephone;

c. a male electrical plug, extending from the second side, complimentary in shape and disposition to the base electrical power connector; and d. an insert power connector, electrically coupled to the male electrical plug, disposed on the first side within the cavity and shaped so as to be coupled to a power connector of a cellular telephone.

3. The speaker-phone base of claim 2, wherein the male electrical plug is complimentary to a female plug of an electrical wall outlet.

* * * * *